Dec. 6, 1966  J. O. SHAFFER  3,289,282
APPARATUS FOR DISMANTLING AND ASSEMBLING ROLL ASSEMBLIES
Filed March 22, 1965  5 Sheets-Sheet 1

INVENTOR.
JAMES O. SHAFFER
BY
ATTORNEY

Dec. 6, 1966        J. O. SHAFFER        3,289,282
APPARATUS FOR DISMANTLING AND ASSEMBLING ROLL ASSEMBLIES
Filed March 22, 1965        5 Sheets-Sheet 2
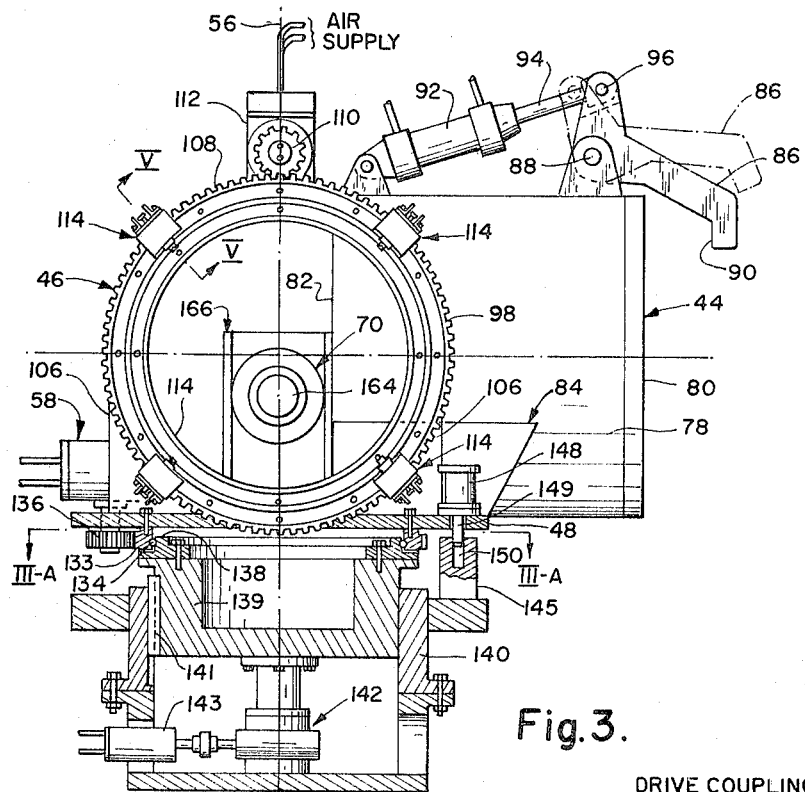
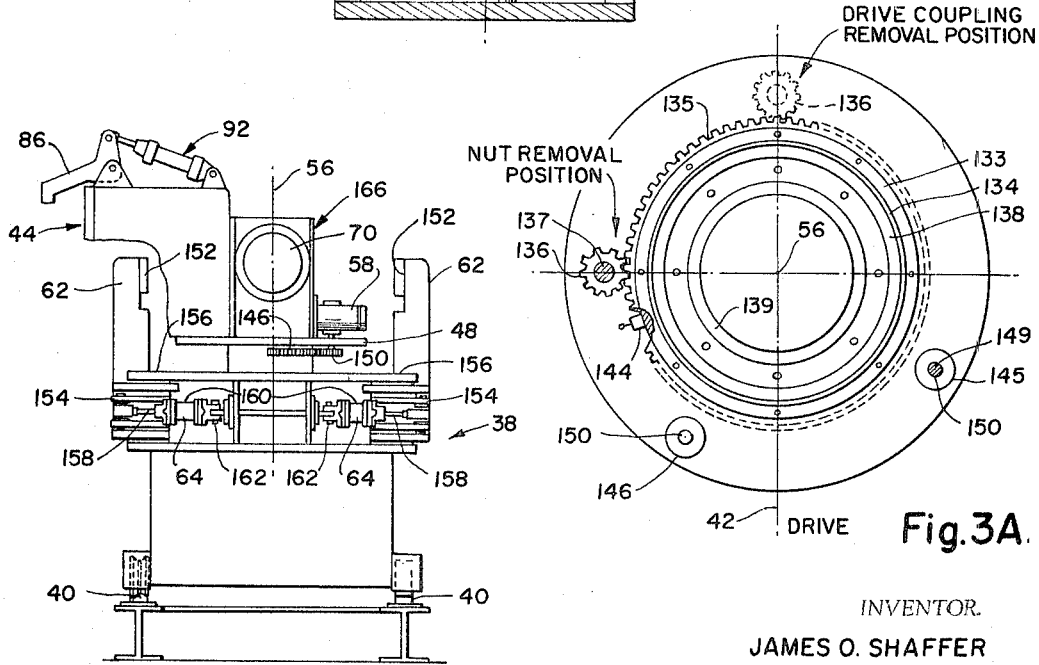
INVENTOR.
JAMES O. SHAFFER
BY
ATTORNEY

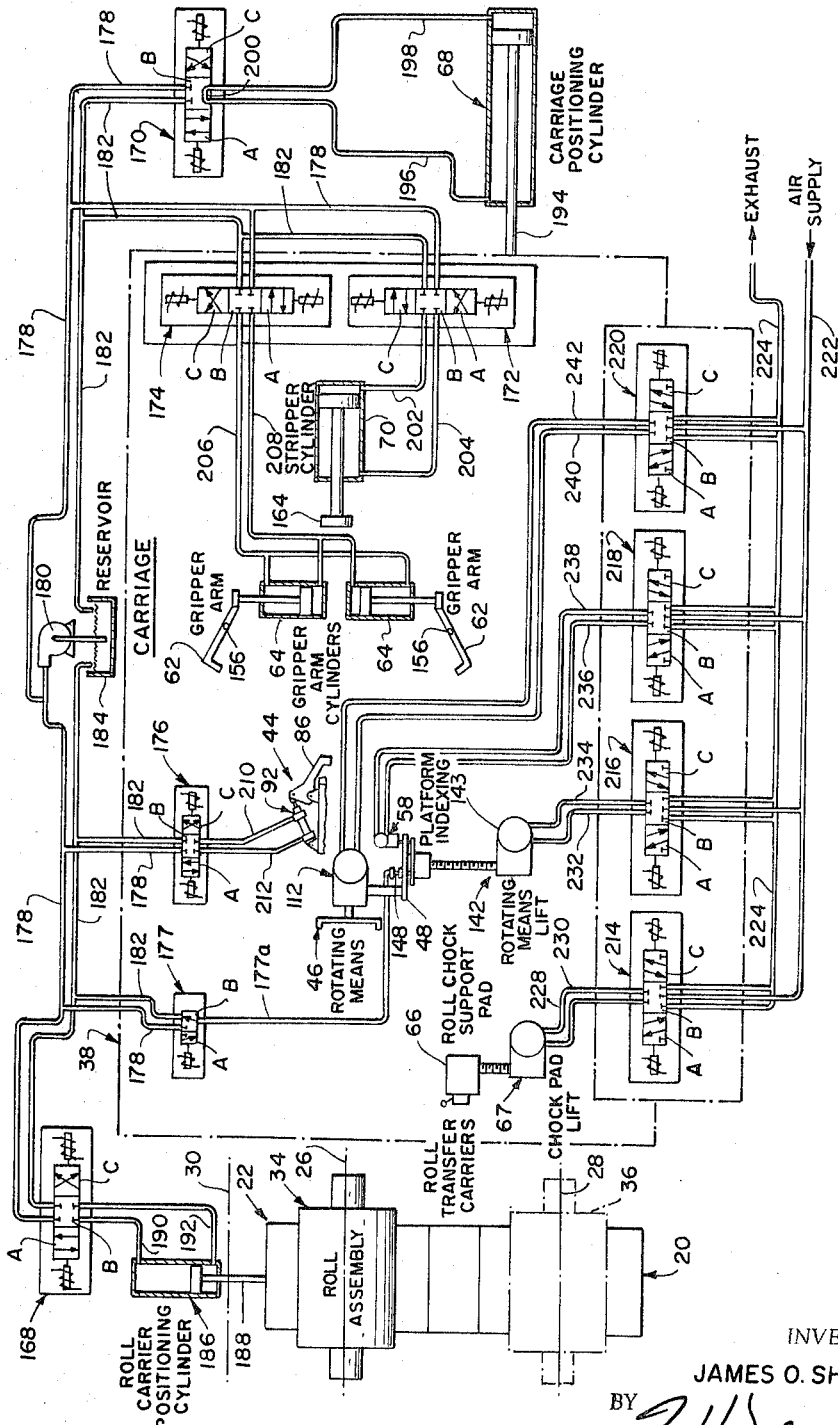

INVENTOR.
JAMES O. SHAFFER
BY
ATTORNEY

United States Patent Office 3,289,282
Patented Dec. 6, 1966

3,289,282
APPARATUS FOR DISMANTLING AND
ASSEMBLING ROLL ASSEMBLIES
James O. Shaffer, Youngstown, Ohio, assignor to The
Youngstown Foundry & Machine Co., Youngstown,
Ohio, a corporation of Ohio
Filed Mar. 22, 1965, Ser. No. 441,786
16 Claims. (Cl. 29—200)

This invention relates to apparatus for dismantling and assembling roll assemblies, and more particularly to apparatus for automatically and in complete safety, stripping the drive coupling, the roll chock retaining nuts and the roll chocks from a roll assembly and thereafter replacing said items on a reconditioned roll body.

As is known, a variety of structural shapes may be formed by passing steel billets through rotating roll assemblies having shape-forming intervals or passes. The roll assembly conventionally includes a roll body in which the shape-forming intervals or passes are cut, a roll chock or bearing housing on the end of the roll body, a retaining nut threaded on the roll neck threads for retaining each roll chock, and a drive coupling on one end of the roll assembly. In order to maintain the proper shape-forming intervals, the roll assemblies must, from time-to-time, be reconditioned. That is to say, it is necessary that the roll assemblies be removed from the roll line and stripped of their drive coupling, roll chock retaining nuts and roll chocks. The stripped roll body is then sent to the roll or machine shop for reconditioning. The stripped drive coupling, roll chock retaining nuts and the roll chocks can then be placed on a reconditioned roll body to form a roll assembly which is then ready for installation in the roll line.

Heretofore, the dismantling and assembling of roll assemblies has been a hazardous, extremely accident-prone, time-consuming and expensive operation. The overall dismantling operation has required several crew members employing sledge hammers, crowbars, etc. as well as many hours of crane time. Removal of the roll chocks has been most difficult. It has normally been necessary to free the roll chocks by striking them with heavy sledge hammers and sometimes with a roll body suspended by a cable sling. The roll chock must be suspended and moved by an overhead crane during its removal or replacement. All-in-all, the crew members have been exposed to disabling accidents and furthermore, a considerable amount of man-hours and crane time has been involved.

Accordingly, as an overall object, the present invention seeks to provide apparatus for dismantling and assembling roll assemblies in a completely automatic manner and in complete safety.

Another object of the invention is to provide apparatus for stripping the drive coupling, roll chock retaining nuts and roll chocks from a roll assembly.

Still another object of the invention is to provide apparatus for supporting the stripped drive coupling, retaining nuts and roll chocks for replacement on a reconditioned roll body.

A further object of this invention is to provide a novel mechanism for rotating the roll chock retaining nuts during removal or replacement of the same.

Still another object of the invention is to provide a rotating mechanism which is adjustable to conform to the size of the retaining nut being removed or replaced.

A further object of the invention is to provide means for automatically and selectively aligning a drive coupling holder and a rotating mechanism with the rotational axis of a roll assembly for the purpose of removing or replacing a drive coupling and roll chock retaining nuts, respectively.

In accordance with the invention, a roll assembly dismantling and assembling apparatus is provided having a work station and two loading stations, one on each side of the work station. A pair of spaced, connected roll carriers is supported on common tracks whereby each carrier is movable from one of the loading stations to the work station. Each of the roll carriers is, for example, adapted to receive and horizontally support a roll assembly at one of the loading stations and thereafter transfer the same to the working station.

At the work station, a carriage is positioned at each end of the roll transfer carrier. Each carriage is supported on a separate track for movement toward and away from the end of the roll assembly, that is, parallel to the rotational axis of the roll assembly. Each carriage is provided with a drive coupling holder and a retaining nut rotating mechanism both supported on a turret-type platform adapted to selectively align the drive coupling holder with the drive coupling and the retaining nut rotating mechanism with the retaining nut. The turret-type platform also is supported for vertical movement whereby the longitudinal axes of the drive coupling holder and the retaining nut rotating mechanism may be aligned with the rotational axis of the roll assembly.

Each of the carriages also is provided with a roll chock removal means comprising a pair of gripping arms adapted to grip the roll chock and roll chock support pads which are movable upwardly into engagement with and for supporting the roll chock during its removal or replacement onto the roll body. Each of the carriages also includes a stripper cylinder engageable with the end of the roll body during removal of a roll chock. The stripper cylinder supplies an additional force, when needed, for moving the carriage away from the roll assembly and, hence, aid in stripping the roll chock from the roll assembly.

The overall arrangement of the present roll assembly dismantling and assembling apparatus is such that a roll assembly which is to be reconditioned, is placed on a roll transfer carrier at one of the loading stations and then transferred to the work station. The drive coupling holder of one of the carriages is employed to remove and support the drive coupling. The rotating mechanisms of both carriages are then engaged with the roll chock retaining nuts. The retaining nuts are rotated and removed from the ends of the roll assembly. Thereafter, the gripping arms of each carriage are engaged with the roll chocks. The support pads are elevated into supporting engagement with the roll chocks whereupon the carriages are forcibly moved away from the roll assembly to remove the roll chocks. If necessary, one or both of the stripper cylinders are activated to aid in removing the roll chocks. The drive coupling, the retaining nuts and the roll chocks are supported by the carriages at a position spaced from the roll body of the roll assembly. The roll body is then moved to the loading station for transfer to the machine shop for reconditioning. Simultaneously with the movement of the stripped roll body to the loading station, a reconditioned roll body, previously placed on the second roll transfer carrier, is now moved into the work station. The above-described operation is reversed whereby the previously stripped roll chocks, retaining nuts and drive coupling are placed on the reconditioned roll body to form a reconditioned roll assembly. The reconditioned roll assembly is then moved to a loading station for transfer to and installation in the roll line.

Roll assemblies which may be dismantled and assembled by the apparatus of this invention include structural rolls, blooming rolls, hot-strip rolls, cold-strip rolls, temper and mill rolls, tandem millwork and back-up rolls and the like.

The above and other objects and advantages of the present invention will become apparent from the following detailed description by reference to the drawings, in which:

FIG. 3 is a fragmentary front view, partially in cross section, of a carriage illustrating a turret-type support for a retaining nut rotating means and a drive coupling holder means;

FIG. 3A is a cross-sectional view taken along the line III–A—III–A of FIG. 3;

FIG. 4 is a rear view of the carriage of FIG. 3 illustrating roll chock removal arms and means for pivoting the same;

FIG. 7 is a schematic diagram of the pneumatic and hydraulic control circuitry associated with the carriages and the roll carrier;

General description

Figure 1:
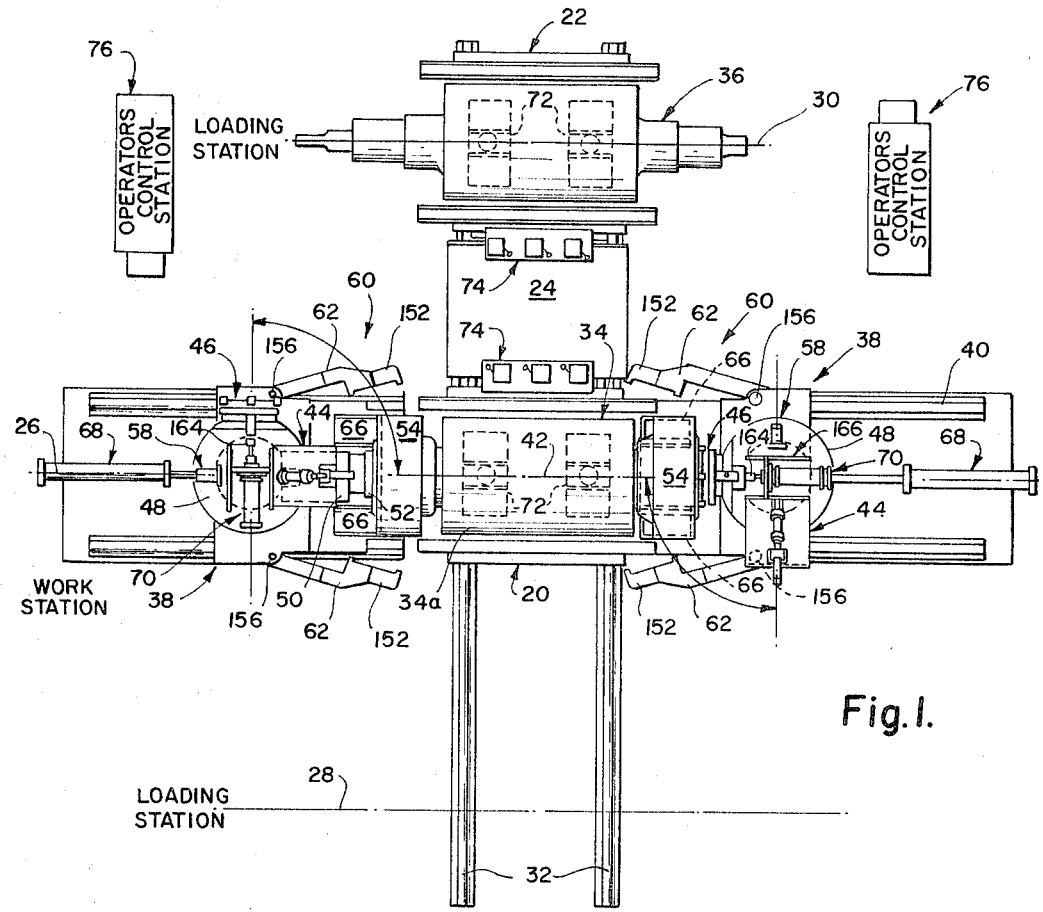
FIGURE 1 is an overall plan view illustrating the roll assembly dismantling and assembling apparatus of the invention.
Figure 2:
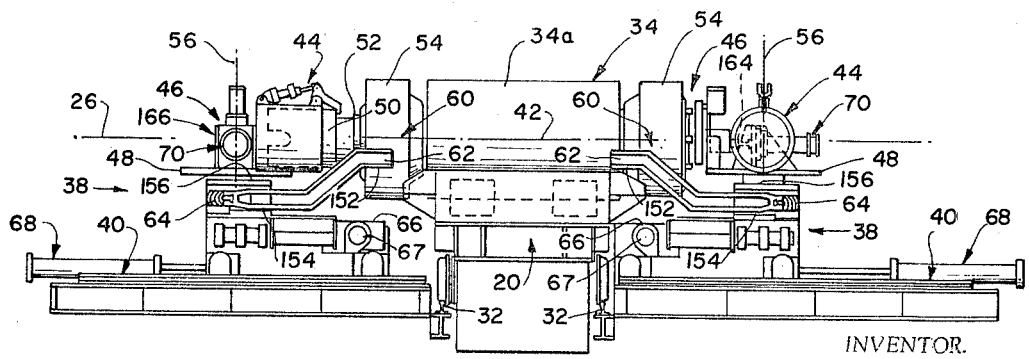
FIG. 2 is a side view illustrating a roll assembly supported on a carrier at the work station illustrated in FIG. 1.

Reference is now directed to FIGS. 1 and 2 wherein the overall arrangement of the present roll assembly dismantling and assembling apparatus is illustrated. As can best be seen in FIG. 1, the present apparatus includes two roll transfer carriers 20, 22 which are spaced apart but connected together by a workman's platform 24. The present apparatus includes a work station indicated by the dash-dot line 26 and two loading stations indicated by the dash-dot lines 28, 30, one on each side of the work station 26. The transfer carriers 20, 22 are so spaced that, for example, when the transfer carrier 20 is at the work station 26, the transfer carrier 22 is at the loading station 30. The roll transfer carriers 20, 22 are supported on a common track 32 for reciprocal movement between the loading stations 28, 30 and the work station 26. As illustrated in FIG. 1, the transfer carrier 20 supports a roll assembly 34 which is in position for dismantling while the transfer carrier 22 supports a roll body 36 which has previously been reconditioned and is ready for reassembly.

Reference is now directed to FIGS. 1 and 2. At the work station and on either side of the roll transfer carrier 20, there is provided a carriage 38 supported on tracks 40 for movement toward and away from the ends of the roll assembly 34. More specifically, the carriages 38 are movable parallel to the rotational axis indicated by the dash-dot line 42 of the roll assembly 34. Each of the carriages 38 is provided with a drive coupling holder means 44 and a retaining nut rotating means 46 both of which are supported on a turret-type platform 48 which is, itself, supported on the carriage 38. The drive coupling holder means 44 is adapted to receive and grip a drive coupling 50 connected to one end of the roll assembly 34. The retaining nut rotating means 46 is adapted to be connected in torque transmitting relation with a retaining nut 52 serving to retain a roll chock 54 at each end of the roll assembly 34. As is known, the roll chocks 54 house the bearings in which the roll body 34a of the roll assembly 34 rotates. The retaining nuts 52 are threaded onto the ends of the roll body 34a into engagement with the roll chocks for retaining the same. As will become apparent, the turret-type platform 48 is pivotal about a vertical axis indicated in FIG. 2 by the dash-dot line 56. Motor means 58 is operatively connected to the turret-type platform 48 and serves to rotate the same about the vertical axis 56 whereby the drive coupling holder means 44 and the retaining nut rotating means 46 may be selectively rotated into alignment with the drive coupling 50 and the retaining nut 52, respectively. As can be seen in FIG. 1, the right-hand carriage 38 has the retaining nut rotating means 46 engaged with the retaining nut (not visible) on that end of the roll assembly 34 while the left-hand carriage 38 has the drive coupling holder means 44 gripping and supporting the drive coupling 50. Inasmuch as both of the carriages 38 are provided with a drive coupling holder means 44, it is not necessary to load the roll assembly 34 onto the roll transfer carrier 20 in a particular position.

Each of the carriages 38 also is provided with roll chock removal means 60 comprising, in general, a pair of gripping arms 62 which are pivotally connected at one end to the carriage 38 and each of which is forcibly moved toward and away from the other arm by motor means 64 (FIG. 2) supported on the carriages 38. The roll chock removal means 60 additionally includes spaced roll chock support pads 66 carried at the forward end of the carriages 38, each of which includes motor means 67 for elevating the same into supporting engagement with the roll chock 54, as will be explained.

Each of the carriages 38 is forcibly moved toward and away from the ends of the roll assembly 34 by means of a hydraulic cylinder 68 connected therewith. The hydraulic cylinder 68 provides the force required to remove the roll chocks 54 from the roll body 34a. In addition to the force provided by the hydraulic cylinder 68, there is an additional force provided by a stripper cylinder 70 which is supported on the turret-type platform 48. The stripper cylinders 70 extend parallel to the rotational axis 42 of the roll assembly 34 and are positioned to engage the ends of the roll body 34a to provide the additional force when required for stripping the roll chocks 54 from the roll body 34a.

As can be seen in FIG. 1, each of the roll transfer carriers 20, 22 is provided with a pair of roll support pads 72 which cooperate to horizontally support a roll assembly or a reconditioned roll body. Each of the roll support pads 72 may be elevated or lowered independently of the other support pad whereby the roll assembly or reconditioned roll may be leveled. Movement of the roll transfer carriers 20, 22 between the loading stations 28, 30 and the work station 26 as well as the elevating and lowering of the roll support pads 72 is accomplished from a control board 74 associated with each of the roll transfer carriers 20, 22 and which are positioned in the region of the workman's platform 24. Operator's control stations 76 are provided with the various control valves (to be described) for operating each of the mechanisms carried on the carriages 38.

Drive coupling holder means 44

Referring now to FIG. 3, the drive coupling holder means 44 comprises a cylindrical member 78 having an open end 80 facing away from the vertical axis 56 and a closed end 82. The cylindrical member 78 is secured to the turret-type platform 48, for example, by means of gussets 84. A gripping member 86 is pivoted as at 88 to the top of the cylindrical member 78. The gripping member 86 has a lower end 90 adapted to engage the drive coupling 50 in the manner best shown in FIG. 2. A hydraulically operated cylinder 92 has a piston rod 94 pivotally connected as at 96 to the upper end of the gripping member 86. The hydraulically operated cylinder 92 serves to elevate the gripping member 86 into the position illustrated by the dash-dot outline, so as to permit the drive coupling 50 to pass into the cylindrical member 78, and thereafter to lower the gripping member into the position shown in full lines to forcibly retain the drive coupling 50 within the cylindrical member 78. Hence, when the carriage 38 is moved away from the roll assembly 34, the drive coupling 50 is stripped from the roll assembly 34 and stored within the cylindrical member 78.

Retaining nut rotating means 46

Figure 5:
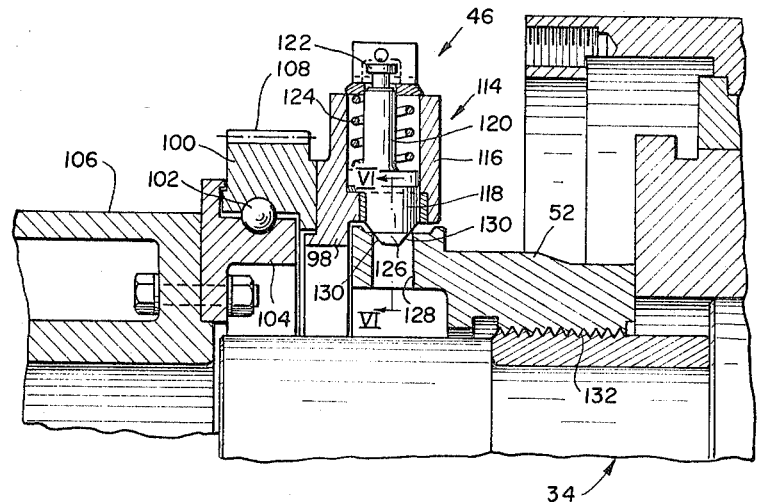
FIG. 5 is a cross-sectional view, taken along the line V—V of FIG. 3 illustrating connector means adapted to connect the retaining nut rotating means in torque transmitting relation with the retaining nut.

Referring now to FIGS. 2, 3, 5 and 6, and in particular to FIG. 5, the retaining nut rotating means comprises a ring member 98 secured to an outer race 100 of a bearing 102. The bearing 102 has an inner race 104 secured to a support member 106 projecting upwardly from the turret-type platform 48. The ring member 98 is thus supported for rotation about a horizontal axis which is coincident with the rotational axis 42 of the roll assembly 34 during the rotation of the retaining nut 52.

At the periphery of the outer race 100 there is formed a plurality of gear teeth forming a ring gear 108 with which is engaged a spur gear 110 operatively connected to and driven by a reversible air or hydraulic motor 112.

At spaced points around the periphery of the ring member 98 there are provided connector means 114 for connecting the ring member 98 in torque transmitting relation with the retaining nut 52. Each of the connector means 114 comprises a housing 116 within which is supported pin member 118. A stem 120 integral with with the pin member 118 extends upwardly through the top of the housing 116 and terminates in a flange member 122. A spring 124 carried within the housing 116 biases the pin member 118 inwardly toward the retaining nut 52.

Figure 6:
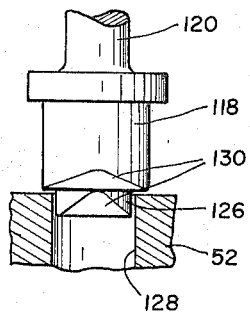
FIG. 6 is a cross-sectional view taken along the line VI—VI of FIG. 5.

As can best be seen in FIGS. 5 and 6, the pin member 118 has a cylindrical lower end portion 126 of reduced diameter, which is adapted to be received in an opening 128 provided in the retaining nut 52. Downwardly converging inclined faces 130 are provided in the lower end portion 126 as well as the upper portion of the pin member 118. The inclined faces 130 face toward and away from the retaining nut 52. The faces 130 serve as cam surfaces causing the pin member 118 to be elevated against the force of the spring 124 when either of the faces 130 is engaged with the retaining nut 52 during movement of the rotating means 56 axially toward and away from the roll assembly 34. However, the cylindrical shape of the lower end portion 126 permits the pin member 118, as can best be seen in FIG. 6, to be engaged in the opening 128 in torque transmitting relation with the retaining nut 52. Hence, when the carriage 38 is moved toward the roll assembly 34 the cam faces 130 engage the end of the retaining nut 52 and cause the pin member 118 to ride over the periphery thereof into engagement with the opening 128, and vice versa. When the air motor 112 is energized, that is, causes the ring member 98 to be rotated in a clockwise or counterclockwise direction, the lower end portions 126 transfer the torque supplied by the air motor 112 to the retaining nut 52 for rotating the same about the rotational axis 42 of the roll assembly 34. Hence, connection with or disengagement from the retaining nut 52 as well as rotation of the retaining nut 52 is accomplished automatically.

As can best be seen in FIG. 5, the retaining nut 52 is threaded onto roll neck threads 132 provided on the end of the roll assembly 34. It should be evident, that during its removal, the retaining nut 52 is moved axially away from the roll assembly 34. Conversely, when the retaining nut 52 is being threaded onto the roll neck threads 132, it moves axially toward the roll assembly 34. Consequently, means (to be described) are provided for permitting the carriage 38 to move axially away from or toward the roll assembly 34 during removal or replacement of the retaining nut 52.

Turret-type platform 48

Referring now to FIGS. 3 and 3A, the turret-type platform 48 is supported for rotation about the vertical axis 56 and for movement along the vertical axis 56, that is, the platform 48 may be elevated or lowered as required to align the horizontal axes of the drive coupling holder means 44 and the rotating means 46 with the rotational axis 42.

Secured to the bottom of the platform 48 is an outer race 133 of a bearing 134. The outer race 133 has formed on its outer surface a plurality of gear teeth forming a ring gear 135 best illustrated in FIG. 3. The ring gear 135 meshes with a pinion 136 carried on a drive shaft 137 of the motor means 58. The motor means 58 preferably comprises a reversible air motor.

The bearing 134 includes an inner race 138 secured to a support member 139 which is vertically slideable in a cylinder 140. The support member 139 is keyed as at 141, to the cylinder 140 to prevent its rotation about the axis 56. The support member 139 is raised and lowered by means of a worm jack 142 powered by motor means 143 which is preferably a reversible air motor. Activation of the motor means 143 raises or lowers the platform 48 whereby the horizontal, longitudinal axes of the drive coupling holder means 44 and the retaining nut rotating means 46 may be positioned coincident with the rotational axis 42.

As can best be seen in FIG. 3A, the platform 48 (not shown) may be rotated about the vertical axis 56 from a first position wherein the rotating means 46 is aligned with the rotational axis 42 of a roll assembly to a second position illustrated by the dotted outline showing of the pinion 150 wherein the drive coupling holder means 44 is aligned with the rotational axis 42 of a roll assembly, and vice versa. As illustrated in FIG. 3A, switch means 144 may be positioned adjacent to the first position of the pinion 136. The switch means 144 is engageable by spaced depending portions of the platform 48 and serves to deenergize the motor means 58. In order to insure the indexing or aligning of the drive coupling holder means 44 and the retaining nut rotating means 46, a pair of socket members 145, 146 are supported on a plate 147 carried by the cylinder 140. The socket members 145, 146 are spaced apart by 90 angular degrees to correspond to the angular spacing of the holder means 44 and the rotating means 46. Carried by the platform 48 is motor means 148 having a piston rod 149 which is receivable in a bore 150 provided in each of the socket members 145, 146. The motor means 148 is preferably hydraulically operated and includes spring means for biasing the piston rod 149 into a retracted position, i.e., spaced from the socket members 145, 146. Thus, after the motor means 58 has been denergized, the motor means 148 is activated to insert the piston rod 149 into the corresponding one of the bores 150.

Roll chock removal means 60

Referring now to FIGS. 1, 2 and 4, each of the gripping arms 62 includes a first or gripping end portion 152 adapted to engage the sides of the roll chocks 54 during removal thereof and a second end portion 154 which is pivoted as at 156 to the carriage 38. As can best be seen in FIG. 4, the motor means 64 preferably comprises a hydraulically operated cylinder having a piston rod 158 pivotally secured to the second end portion 154 of the gripping arms 62 and a cylinder 160 pivotally secured to the carriage 38 as at 162. The overall arrangement is such that when the piston rods 158 are retracted within the cylinder 160, the gripping arms 62 are spread apart as best shown in FIG. 1, and when the piston rods 158 are forced out of the cylinder 160, the gripping arms 62 are moved toward each other to engage the opposite sides of the roll chock 54 for removing the same. As will be described, the hydraulic cylinder 68 (FIG. 1) moves the carriage 38 away from the roll assembly to forcibly remove or strip the roll chock 54 from the roll assembly.

*Stripper cylinder 70*

Referring now to FIGS. 1, 2, 3 and 4, the stripper cylinder 70 preferably comprises hydraulically operated piston and cylinder means including a piston rod 164. Support structure 166 supports the stripper cylinder on the platform 48 and positions the same horizontally whereby when the stripper cylinder is activated, the piston rod 164 is moved into engagement with the end of the roll neck of the roll assembly, as best shown in FIGS. 1 and 2.

*Control circuitry and operation of present apparatus*

Reference is now directed to FIG. 7 wherein the hydraulic and pneumatic circuitry associated with the roll chock transfer carriers 20, 22 and the apparatus carried by the carriages 38 is schematically illustrated. It should be noted at this time, that the hydraulic and pneumatic circuitry of the carriages is identical. Consequently, the hydraulic and pneumatic circuitry of only one of the carriages 38 will be described.

The hydraulic circuitry of each of the carriages 38 includes five three-position, solenoid operated valve means 168, 170, 172, 174 and 176 and one two-position, solenoid operated valve means 177 for operating the various hydraulic cylinders of the present apparatus. Each of the valve means 168-176 includes a valve spool having spool portions designated by the letters A, B and C while the valve means 177 includes a valve spool having valve spool portions A and B. All of the valve means 168-177 have hydraulic fluid communicated thereto by a common supply conduit 178 and have the hydraulic fluid discharged therefrom by a common conduit 182 extending to a reservoir 184.

With respect to the roll transfer carriers 20, 22, there is provided a hydraulically operated motor means 186 having a piston rod 188 connected, for example, to the roll transfer carrier 22. Conduits 190, 192 extend from the ends of the motor means 186 to the valve means 168. As illustrated in FIG. 7, the spool portion B of the valve means 168 is aligned with the conduits 190, 192 and corresponds to the neutral or shutoff position of the valve means 168, that is, no fluid is flowing into or out of the motor means 186. When the spool portion C of the valve means 168 is aligned with the conduits 190, 192, hydraulic fluid flows through the conduit 192 into the motor means 186 thereby causing the roll transfer carrier 22 to be moved to the loading station 30 while the roll transfer carrier 20 is moved to the work station 26. Simultaneously, fluid is discharged through the conduit 190 into the discharge conduit 182 and back to the reservoir 184. Conversely, when the spool portion A is aligned with the conduits 190, 192, hydraulic fluid is communicated through the conduit 190 into the motor means 186 causing the roll transfer carrier 22 to be moved from the loading station 30 back to the work station 26. Simultaneously, fluid is discharged from the motor means 186 through the conduit 192 to the discharge conduit 182 back to the reservoir 184.

With respect to the carriage 38, the motor means 68 is preferably hydraulically operated and includes a piston rod 194 connected to the carriage 38. Conduits 196, 198 extend from the ends of the motor means 68 to the valve means 170 which, in turn, communicates with the supply conduit 178 and discharge conduit 182. The operation of the valve means 170 is identical to the operation of the valve means 168. Consequently, when the spool portion A of the valve means 170 is aligned with the conduits 196, 198, the carriage 38 is moved toward the roll assembly 34. Conversely, when the spool portion C of the valve means 170 is aligned with the conduits 196, 198, the carriage 38 is moved away from the roll assembly 34.

As stated above, means is provided for permitting the carriage 38 to move away from or toward the roll assembly 34 during removal or replacement of the retaining nut. Movement of the carriage 38 is conveniently accomplished by bleeding a portion of the hydraulic fluid from one end of the motor means 68 and introducing fluid into the other end of the motor means 68. To accomplish this most conveniently, a restriction or groove 200 may be provided in the spool portion B of the valve means 170 which communicates at one end with the conduit 196 and at the other end with the conduit 198. Consequently, when a retaining nut is being threaded onto the roll neck of the roll assembly, the carriage must move toward the roll assembly. This movement causes fluid to be bled from the motor means 68 through the conduit 196, the restriction 200 and through the conduit 198 back to the motor means 68. Conversely when a retaining nut is being removed from the roll assembly, the carriage 38 must move away from the roll assembly. This movement is permitted by bleeding fluid from the motor means 68 through the conduit 198, the restriction 200 and through the conduit 196 back to the motor means 68. It should be noted that the restriction 200 is provided in the spool portion B and hence does not affect the operation of the valve means 170 with respect to moving the carriage 38 toward or away from the roll assembly 34.

The stripper cylinder 70 also is hydraulically operated and includes conduits 202, 204 communicating with the valve means 172. Operation of the valve means 172 is identical to the operation of the valve means 168, 170. Hence, the piston rod 164 may be moved toward and away from engagement with the end of the roll neck by positioning the spool portions A and C of the valve means 172 in communicating relation with the conduits 202, 204.

The gripper arms 62 are moved by the motor means 64 each preferably comprising a hydraulically operated cylinder having conduits 206, 208 extending to the valve means 174. Operation of the valve means 174 is identical to the operation of the valve means 168–172. Hence, the gripper arms 62 are movable toward and away from engagement with the roll chock by positioning the spool portions A and C of the valve means 174 in communicating relation with the conduits 206, 208.

The motor means 92 serving to pivot the gripping member 86 of the drive coupling holder means 44, also is preferably hydraulically operated and includes conduits 210, 212 which extend to and communicate with the valve means 176. The gripping member 86 may be pivoted toward and away from engagemnet with a drive coupling housed in the drive coupling holder means 44 by positioning the spool portions A and C in communicating relation with the conduits 210, 212.

To complete the description of the hydraulic circuitry, the motor means 148 serving to insure alignment of the holder means 44 and the rotating means 46 with the rotational axis 42, is preferably hydraulically operated and includes the piston rod (heretofore described) which is biased in a retracted position. Hence, a single conduit 177a extends from the motor means 148 and communicates with the valve means 177. When the spool portion B is aligned with the conduit 177a, fluid is discharged from the motor means 148 back to the reservoir 184 thereby permitting the piston rod to be retracted. However, when the spool portion A is aligned with the conduit 177a, fluid is admitted into the motor means 148 to extend its piston rod into one of the bores 150 as heretofore explained.

The pneumatic circuitry, which now remains to be described, includes four three-position, solenoid operated valve means 214, 216, 218 and 220 all of which are supplied with air under pressure by a common supply conduit 222. All of the valve means 214-220 communicate with a common exhaust conduit 224. All of the valve means 214-220 are similar in construction and include spool portions indicated by the letters A, B and C.

The valve means 214 controls the operation of motor means 67 which preferably comprises a reversible air motor. The motor means 67 serves to raise and lower the roll chock support pads 66. Conduits 288, 230 communicate air from the valve means 214 to the air motor 67 and discharge the same therefrom. Hence, when the spool portion A of the valve means 214 is aligned with the conduits 228, 230, air under pressure is introduced through the conduit 228 into the air motor 67 for elevating the support pad 66 while air is discharged through the conduit 230 into the discharge conduit 224. Conversely, when the spool portion C of the valve means 214 is positioned in alignment with the conduits 228, 230, air under pressure is introduced through the conduit 230 into the air motor 67 or lowering the support pad 66 while air is being discharged through the conduit 228 out through the discharge conduit 224.

The valve means 216 supplies air under pressure by means of conduits 232, 234 to the motor means 144 for raising or lowering the turret-type platform 48. Operation of the valve means 216 is identical with the operation of the valve means 214 heretofore described.

The valve means 218 serves to communicate pressurized air through conduits 236, 238 to the air motor 58 so as to rotate the turret-type platform 48 for the purpose of aligning the rotating means 46 or the drive coupling holder means 44 with the rotational axis of the roll assembly as described above. Operation of the valve means 218 is identical to the operation of the valve means 214, heretofore described.

The valve means 220 controls the introduction of pressurized air through conduits 240, 242 to the air motor 112 which is operatively connected to and serves to rotate the ring member of the rotating means 46. Operation of the valve means 220 is identical to the operation of the valve means 214.

It is to be understood at this time that the electrical circuitry associated with the solenoids which operate the valves means 168-176 and 214-220 have not been illustrated inasmuch as they are of conventional design. The switch means for energizing and deenergizing these solenoids are, of course, located at the operator's control stations 76 illustrated in FIG. 1.

In operation, the motor means 186 is energized to displace, for example, the roll transfer carrier 22 from the loading station wherein a roll assembly 34 has been loaded onto the roll transfer carrier 22, to the work station 26. The air motor 58 is energized so as to index or rotate the turret-type platform 48 whereby the drive coupling holder means 44 is aligned with the rotational axis of the roll assembly. The motor means 92 is then energized to elevate the gripping member 86 above the cylindrical member 70 whereupon the motor means 68 is energized to move the carriage toward the roll assembly 34 until the drive coupling has been introduced into the drive coupling holder means 44. The valve means 176 is reversed whereby the motor means 92 pivots the gripping member 86 downwardly into gripping engagement with the drive coupling. Thereafter, the valve means 170 is reversed whereby the motor means 68 withdraws the carriage 38 away from the roll assembly 34 until such time as the drive coupling 50 clears the end of the roll neck of the roll assembly.

At that time, the valve means 218 is reversed whereby the turret-type platform 48 is rotated to bring the rotating means 46 into alignment with the rotational axis of the roll assembly 34. Again, the valve means 170 is reversed whereby the motor means 68 moves the carriage 38 toward the roll assembly 34 until such time as the rotating means 46 is connected to the retaining nut in torque transmitting relation. The air motor 112 is now energized to rotate the rotating means 46 in the appropriate direction to unthread the retaining nut from the roll neck threads of the roll assembly 34. It should be remembered, that the restriction 200 provided in the spool portion B of the valve means 170 permits fluid to be displaced from the motor means 68 so that the carriage 38 is moved away from the roll assembly 34.

When the retaining nut has been disengaged from the roll neck threads, the motor means 68 is again energized to move the carriage 38 away from the roll assembly 34 so as to position the gripper arms 62 relative to the sides of the roll chock. At this time, the motor means 64 are energized to pivot the gripper arms 62 into engagement with the sides of the roll chock. Prior to removing the roll chock, the air motor 67 is energized to elevate the roll chock support pads 66 into supporting engagement with the roll chock. Thereafter, the motor means 68 is again energized to withdraw the carriage 38 away from the roll assembly 34 whereby the roll chock is stripped from the roll assembly 34. If required, the stripper cylinder 70 may be energized to supply an additional force for stripping the roll chock from the roll assembly 34. When the roll chock has been completely disengaged from the roll assembly, the carriage 38 continues to move away from the roll assembly 34 until the roll chock is completely clear of the roll assembly 34. It is to be understood at this time that the various equipment supported on the carriages 38 are operable simultaneously or separately. Hence, although the above description refers to only one of the carriages 38, it is to be understood that this description refers also to the other of the carriages 38.

When the carriages 38 have been moved a sufficient distance away from the stripped roll body, the motor means 186 is activated to transfer the roll transfer carrier 22 to the station 30 whereat the stripped roll body is removed and sent to the machine shop. Prior to movement of the roll transfer carrier 22 to the station 30, a reconditioned roll body 36 shown in dash-dot outline in FIG. 7, is loaded onto the roll transfer carrier 20. Hence, when the roll transfer carrier 22 is moved to the station 30, the roll transfer carrier 20 is moved simultaneously therewith to the work station 26 and is in position for replacement of the previously stripped roll chocks, retaining nuts and drive coupling. Replacement of the roll chocks, retaining nuts and the drive coupling is, of course, accomplished by reversing the procedure described above.

It should be evident then that the present dismantling and assembling apparatus provides a means for continually stripping and reassembling roll assemblies automatically, and with complete safety. Thus, as one roll assembly is being stripped, a reconditioned roll body may be placed on the empty roll transfer carrier. When the roll assembly has been stripped, the stripped roll body is moved to the loading station whereupon the reconditioned roll is moved to the work station and is in position to have the roll chocks, the retaining nuts and the drive coupling replaced thereon. After the reconditioned roll assembly has been assembled, it is moved back to the loading station whereupon it is transferred to the roll line for installation therein.

*Connector means—alternative embodiment*

Figure 8:
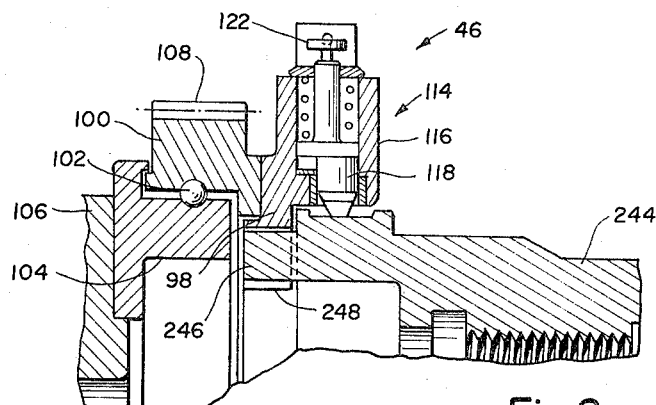
FIG. 8 is a cross-sectional view, similar to FIG. 5, illustrating an alternative means for rotating a roll chock retaining nut.

In FIG. 8, there is illustrated an alternative embodiment of the connector means associated with the rotating means 46. Corresponding numerals will be employed to identify corresponding parts heretofore described.

In FIG. 8 there is illustrated a retaining nut 244 which is provided with a plurality of equiangularly spaced lugs 246 projecting outwardly from the rear face thereof. The present rotating means 46 can be easily adapted for rotating the retaining nut 244 by providing a plurality of equiangularly spaced corresponding lugs 248 which are secured to and project radially inwardly from the ring member 98. It should be evident by inspection of FIG. 8, that the lug 248 is positioned behind and engaged with the lug 246 of the retaining nut 244. Consequently, rotation of the ring member 98 in a direction which moves the lug 248 out of the plane of the drawing, will cause the retaining nut 244 to be threaded onto the roll neck threads (not shown). Conversely, rotation of the ring member in the reverse direction will cause the lug 248 to engage the next adjacent lug 246 of the retaining nut 244 whereby the retaining nut 244 is unthreaded from the roll neck threads (not shown).

*Rotating means 46—adapter members*

In FIGS. 9–12 inclusive, there are illustrated two adapter members which are easily connected to the rotating means 46 and which are adapted to engage retaining nuts of different diameters. Corresponding numerals will be employed to identify corresponding parts heretofore described.

Figure 9:
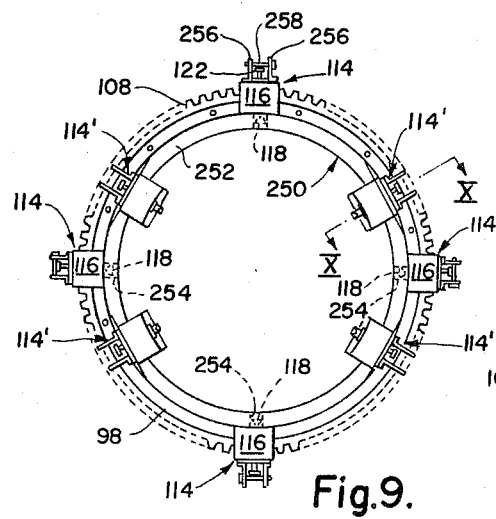
FIG. 9 is a fragmentary front view illustrating the retaining nut rotating means provided with an adapter for rotating retaining nuts of a smaller diameter.
Figure 10:
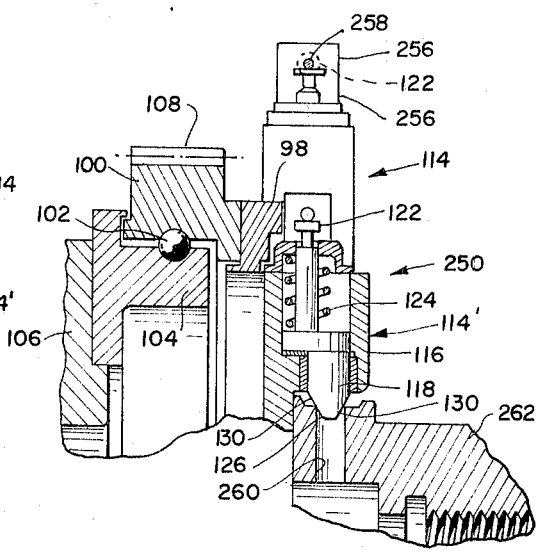
FIG. 10 is a cross-sectional view taken along the line X—X of FIG. 9.

Referring now to FIGS. 9 and 10, there is illustrated an adapter member 250 comprising a ring member 252 having spaced radially extending openings 254 in its periphery in which are engaged the pin members 118 of the connector means 114, heretofore described. As can be seen, each of the connector means 114 includes a pair of upstanding plate members 256 between which resides the flange member 122 of the stem 120 (see FIG. 5). Extending through openings provided in the plate member 256 is a locking pin 258 which engages the top of the flange member 122 to lock the pin member 118 within the opening 254. The adapter member 250 is, in this manner, locked to the ring member 98 of the rotating means 44.

At spaced points around the ring member 52 of the adapter member 250 there are provided connector means 114' which are substantially identical in construction to the connector means 114 heretofore described. Consequently, as can best be seen in FIG. 10, each of the connector means 114' includes a housing 116 within which resides a pin member 118 having a cylindrical lower end portion 126 provided with downwardly converging inclined faces 130. Connected to the pin member 118 is a stem 120 which projects upwardly through the top of the housing 116 and terminates in a flange member 122. A spring 124 biases the pin member 118 into engagement with an opening 260 provided in a retaining nut 262. As can be seen in FIG. 9, the distance between each pair of diametrically opposite connector means 114' of the adapter member 250 is less than the distance between each pair of diametrically opposite connector means 114 provided on the ring member 98. Consequently, the adapter 250 serves to connect the rotating means 46 in torque transmitting relation with the retaining nut 262 which is of smaller diameter.

Figure 11:
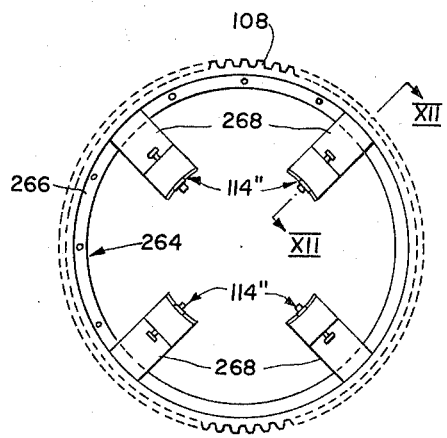
FIG. 11 is a fragmentary front view illustrating a retaining nut rotating means provided with an adapter having an alternative configuration, by which still smaller diameter retaining nuts may be rotated.
Figure 12:
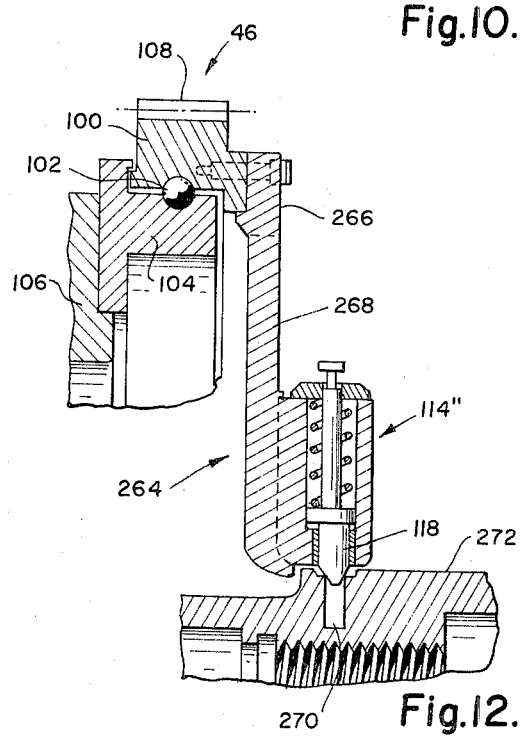
FIG. 12 is a cross-sectional view taken along the line XII—XII of FIG. 11.

Reference is now directed to FIGS. 11 and 12 wherein an adapter member 264 is illustrated and which serves to connect the rotating means 46 in torque transmitting relation with a retaining nut of still smaller diameter. Corresponding numerals will be employed to identify corresponding parts heretofore described.

In this embodiment, the ring member 98 and its connector means 114 are removed from the outer race 100 of the bearing 102. The adapter member 264 comprises a ring member 266 which is secured to the outer race 100 of the bearing 102 in place of the ring member 98. At spaced points along the ring member 266 there is provided a plurality of arms 268 which project radially inwardly toward the center of the ring member 266. Carried at the end of each of the arms 268 is a connector means 114'' whose construction is substantially identical to the construction of the connector means 114. Hence, the connector means 114'' includes a pin member 118 which is receivable within an opening 270 provided in a retaining nut 272. The diameter of the retaining nut 272 is, of course, smaller than the diameters of the retaining nuts 52 and 262. The connector means 114'' are, of course, automatically engaged with and disengaged from the retaining nut 272.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In apparatus for forcibly rotating a roll chock retaining nut to effect threading or unthreading of the retaining nut relative to a roll assembly, the combination comprising: a carriage; a ring member; means supporting said ring member on said carriage for rotation about the rotational axis of the nut; connector means carried by said ring member for connecting said ring member in torque transmitting relation with the nut; motor means operatively connected with said ring member for forcibly rotating said ring member about the rotational axis of the nut; and means supporting said carriage for guided movement parallel with the rotational axis of the nut, whereby said carriage is movable relative to the roll assembly during and by the rotation of the nut.

2. The combination as defined in claim 1 wherein said connector means comprises a plurality of angularly spaced, outwardly displaceable pin members positioned on said ring member for insertion into corresponding openings in the roll chock retaining nut.

3. The combination as defined in claim 1 wherein said connector means comprises a plurality of angularly spaced lugs positioned on the periphery of said ring member for engagement with corresponding lugs formed on the roll chock retaining nut.

4. In apparatus for forcibly rotating a roll chock retaining nut to effect threading or unthreading of the retaining nut relative to a roll assembly, the combination comprising: a carriage; a platform supported on said carriage for vertical movement relative thereto; a ring member supported on said platform for rotation about a horizontal axis; means for raising or lowering said platform to align the horizontal axis of said ring member with the rotational axis of the nut; connector means carried by said ring member for connecting said ring member in torque transmitting relation with the nut; motor means operatively connected to said ring member for forcibly rotating the same about said horizontal axis; and means supporting said carriage for guided movement parallel with the rotational axis of the nut, whereby said carriage is movable relative to the roll assembly during and by rotation of the nut.

5. In apparatus for forcibly rotating a roll chock retaining nut to effect threading or unthreading of the retaining nut relative to a roll assembly, the combination comprising: a carriage; a ring member; means supporting said ring member on said carriage for rotation about the rotational axis of the nut; means carried by said ring member for connecting said ring member in torque transmitting relation with the nut; motor means operatively connected with said ring member for forcibly rotating said ring member about the rotational axis of the nut; means supporting said carriage for guided movement parallel to the rotational axis of the nut; fluid-operated motor means for moving said carriage toward and away from said roll assembly; and means operatively associated with said fluid-operated motor means for bypassing said motor means to permit movement of said carriage relative to said roll assembly during and by the rotation of the nut.

6. In apparatus for forcibly rotating a roll chock retaining nut to effect threading or unthreading of the retaining nut relative to a roll assembly, the combination comprising: a carriage; a ring member; means supporting said ring member on said carriage for rotation about the rotational axis of the nut; connector means carried by said ring member for connecting said ring member in torque transmitting relation with the nut; motor means operatively connected to said ring member for forcibly rotating said ring member about said rotational axis; means supporting said carriage for guided movement parallel with said rotational axis; fluid-operated motor means connected to said carriage for moving said carriage and hence said ring member into torque transmitting engagement with the nut to be rotated; and means for bleeding operating fluid from said fluid-operated motor means whereby said carriage is moved relative to said roll assembly during and by the rotation of the nut.

7. In apparatus for simultaneously rotating roll chock retaining nuts at each end of a roll assembly to effect threading or unthreading of the retaining nuts relative to the roll assembly, the combination comprising: a carriage positioned at each end of said roll assembly and supported for guided movement toward and away from said roll assembly substantially parallel with the rotational axis of said roll assembly; retaining nut rotating means carried by each carriage; each of said retaining nut rotating means comprising a ring member supported on the carriage for rotation about the rotational axis of said roll assembly, connector means carried at spaced points on said ring member for connecting said ring member in torque transmitting relation with the nut, and drive means operatively connected to said ring member for rotating the same about said rotational axis; motor means associated with each carriage for moving the carriages and hence the retaining nut rotating means toward and away from torque transmitting engagement with the nuts.

8. Apparatus for removing and replacing a roll chock retaining nut and a drive coupling of a roll assembly, said apparatus comprising in combination: a carriage supported for reciprocal movement parallel with the rotational axis of a roll assembly; means adjacent to said carriage for retaining said drive coupling; means adjacent to said carriage for rotating said retaining nut; means movably connected to said carriage for supporting both said retaining means and said rotating means; first drive means operatively connected to said supporting means for selectively positioning said retaining means in alignment with said drive couplings and said rotating means in alignment with said retaining nut; and second drive means operatively connected to said carriage for moving the same toward and away from said roll assembly.

9. Apparatus for removing and replacing a roll chock retaining nut and a drive coupling of a roll assembly, comprising in combination: a carriage supported for movement parallel with the rotational axis of a roll assembly; a platform; means for supporting said platform on said carriage for rotation about a vertical axis which intersects said rotational axis; means for supporting said platform for movement along said vertical axis; means secured to said platform for receiving and retaining said drive coupling; means secured to said platform and spaced from said retaining means for rotating said retaining nut; motor means operatively connected to said platform for moving the same along said vertical axis to position the longitudinal axes of said retaining means and said rotating means in a common plane with said rotational axis; first drive means for rotating said platform about said vertical axis to selectively position said retaining means in alignment with said drive coupling and said rotating means in alignment with said retaining nut; and second drive means operatively connected to said carriage for moving said carriage toward and away from said roll assembly.

10. In apparatus for removing a drive coupling, retaining nuts and roll chocks from the ends of a roll body of a roll assembly, the combination comprising: a carrier horizontally supporting said roll assembly; a carriage at each end of said roll assembly; track means extending parallel to the rotational axis of said roll assembly for movably supporting each of the carriages; means operatively connected to each carriage for moving each carriage toward and away from the ends of said roll assembly; each carriage having a platform supported for rotation about a vertical axis; means carried by said platform for receiving and retaining said drive coupling; means carried by said platform for rotating said retaining nut; drive means operatively connected to said platform for rotating the same about said vertical axis to selectively position said retaining means in alignment with said drive coupling at one end of said roll assembly and thereafter position said rotating means in alignment with said retaining nut, and vice versa; roll chock gripping means carried at the forward end of said carriage for forcibly gripping said roll chock, said roll chock gripping means being operable after the removal of said retaining nuts; and roll chock support pads carried at the forward end of said carriage for supporting said roll chock on said carriage during its removal.

11. The combination of claim 10 wherein said platform is supported for vertical movement along said vertical axis; and including means for moving said platform along said vertical axis for aligning the longitudinal axes of said retaining means and said rotating means with the rotational axis of said roll assembly.

12. The combination of claim 10 wherein said retaining means comprises a cylindrical member having an open end through which said drive coupling is received and a closed end, a retaining finger pivotally connected to said cylindrical member for movement toward and away from said open end, and fluid-operated motor means connected to said retaining finger for forcibly retaining the same engaged with the drive coupling during removal of the drive coupling and for maintaining said retaining finger spaced from said open end.

13. The combination of claim 10 wherein said rotating means comprises a ring member supported on said platform for rotation about the rotational axis of said roll assembly; connector means carried by said ring member for connecting said ring member in torque transmitting relation with said retaining nut; and motor means operatively connected to said ring member for forcibly rotating the same.

14. The combination of claim 10 wherein said roll chock gripping means comprises a pair of arms having first ends engageable with the opposite sides of said roll chock and second ends pivotally secured to said carriage, means operatively connected with said second ends of said arms for pivoting said arms toward and away from each other in unison to effect movement of said first ends away from each other and toward each other.

15. The combination of claim 10 including stripper cylinder means supported on said platform parallel with the longitudinal axis of said rotating means, said stripper cylinder means including a piston rod whose end is engageable with the end of said roll assembly, said stripper cylinder means providing an additional force for freeing said roll chock from said roll assembly.

16. In apparatus for removing a drive coupling, roll chock retaining nuts and roll chocks from a roll assembly and for replacing the same on a reconditioned roll body, the combination comprising: a carrier adapted to horizontally support a roll assembly; a carriage adjacent to each end of said roll assembly; track means extending parallel with the rotational axis of said roll assembly for movably supporting each of the carriages; first motor means operatively connected to each of said carriages for moving each carriage toward and away from an end of said roll assembly independently of the other of said carriages; a platform supported on each of said carriages for rotation about a vertical axis intersecting said rotational axis and for vertical movement along said vertical axis; means for receiving and retaining said drive coupling associated with each platform, comprising a horizontal cylindrical member having an open end for receiving said drive coupling and a closed end, a retaining finger pivotally connected to said cylindrical member, and means for pivoting said retaining finger toward and away from engagement with said drive coupling; means associated with each platform for rotating said retaining nuts, comprising a ring member supported on said platform for rotation about said rotational axis, connector means carried at spaced points on said ring member for connecting the same in torque transmitting relation with said retaining nut, and reversible motor means operatively connected to said ring member for forcibly rotating the same; second motor means operatively connected with each of said platforms for moving the same along said vertical axis to position the longitudinal axes of said cylindrical member and said ring member in a common plane with said rotational axis; third motor means operatively connected with each platform for rotating each platform about said vertical axis to selectively position said cylindrical member in alignment with said rotational axis and thereafter said rotating means in alignment with said rotational axis and vice versa; roll chock gripping means carried at the forward end of each carriage for forcibly gripping each roll chock, each of said roll chock gripping means comprising pair of arms having first ends pivotally supported on the carriage and second ends positioned for engagement with the opposite sides of the roll chock, means operatively connected with said second ends of said arms for pivoting said first ends in unison toward each other for gripping the roll chock and away from each other for releasing the roll chock; and roll chock support pads carried at the forward end of each carriage for movement into and out of supporting engagement with the roll chock; said first motor means cooperating with said roll chock gripping means and said roll chock support pads for forcibly freeing and removing the roll chocks from said roll assembly and for replacing the roll chocks on a reconditioned roll body.

References Cited by the Examiner
UNITED STATES PATENTS

| | | | |
|---|---|---|---|
| 2,929,134 | 3/1960 | Mosher | 29—240 |
| 2,948,056 | 8/1960 | Muenchinger | 29—240 X |

JOHN F. CAMPBELL, *Primary Examiner.*

THOMAS H. EAGER, *Examiner.*